United States Patent Office 3,392,165
Patented July 9, 1968

3,392,165
ESTRA-1,3,5(10)-TRIENES SUBSTITUTED AT THE 17α-POSITION WITH A PROPADIENYL OR SUBSTITUTED PROPADIENYL RADICAL
John A. Edwards, Los Altos, Calif., and Lawrence H. Knox, deceased, late of Mexico City, Mexico, by Anne A. Knox, Mexico City, Mexico, assignors to Syntex Corporation, Panama, Panama, a corporation of Panama
No Drawing. Continuation-in-part of application Ser. No. 514,136, Dec. 15, 1965. This application Mar. 30, 1966, Ser. No. 539,259
18 Claims. (Cl. 260—239.55)

This application is a continuation-in-part of United States application Ser. No. 514,136, filed Dec. 15, 1965.

This invention relates to novel cyclopentanophenanthrene derivatives having a 17α-diethylenically unsaturated side chain.

More particularly, the present invention relates to novel compounds of the formula:

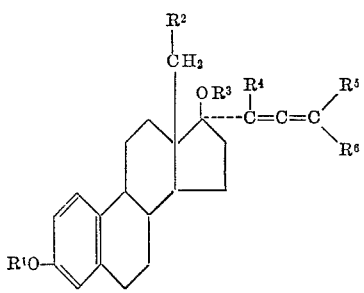

wherein $R^1$ represents hydrogen, lower alkyl, cycloalkyl, a carboxylic acyl group of less than 12 carbon atoms, tetrahydropyran-2-yl, or tetrahydrofuran-2-yl; $R^2$ represents hydrogen or a lower alkyl containing from 1 to 3 carbon atoms such as methyl, ethyl or propyl; $R^3$ represents hydrogen, a carboxylic acyl group of less than 12 carbon atoms, tetrahydroypran-2-yl, or tetrahydrofuran-2-yl; and each of $R^4$, $R^5$ and $R^6$ is hydrogen or methyl.

The carboxylic acyl groups of the compounds of the present invention contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The lower alkyl groups represented by $R^1$ in the above formula may be of straight or branched structure. Typical alkyl groups include methyl, ethyl, isopropyl, butyl, and the like, containing up to about 7 carbon atoms. The cycloalkyl groups represented by $R^1$ in the above formula include, e.g., cyclopentyl, cyclohexyl, and the like, containing from 3 to about 7 carbon atoms.

The novel 17 α-diene steroids of the present invention possess estrogenic activity and are useful in the treatment of the various conditions in which such agents are indicated, such as estrogen difficiencies, menopause, and the like. These compounds may also be used in veterinary medicine in the same manner as known estrogens and in the control and regulation of fertility. In addition, these agents demonstrate antiandrogenic activity. They may be administered in the usual pharmaceutical forms at dosages appropriate for the condition being treated.

The compounds of the present invention may be prepared according to a process which may be illustrated as follows:

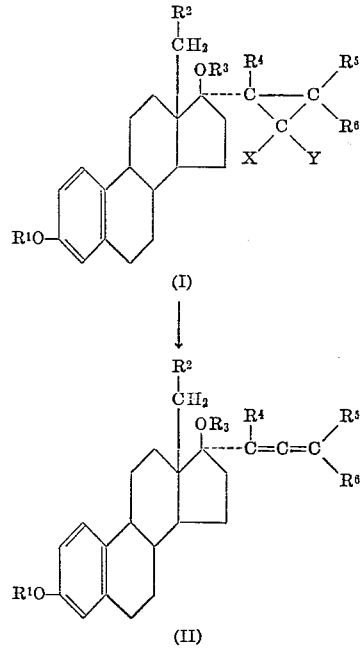

wherein $R^1$, $R^2$, $R^3$, $R^4$, $R^5$ and $R^6$ are as previously defined and X and Y are each bromo, chloro or fluoro. This ring opening dehalogenation is preferably performed with those compounds wherein X and Y are chloro or bromo.

In practicing the above illustrated transformation, one method is to treat the 17α-dihalocyclopropyl compound with magnesium in a reaction medium such as diethyl ether, tetrahydrofuran, dioxane, or the like. The reaction may be conducted at a temperature of from room temperature to the reflux temperature for a period time of the order of two to twenty-four hours or more, preferably at reflux temperature for about two hours.

A second method for the preparation of the compounds of the present invention is to treat the 17α-dihalocyclopropyl steroids of Formula I with from about 3 to about 10 molar equivalents of an alkylsulfinyl carbanion such as sodium methylsulfinylcarbanion in dimethyl sulfoxide or other inert solvent medium such as the ethers, e.g. diethyl ether, tetrahydrofuran, dioxane, and the like at room temperature or above for a period of time of the order of about three to twenty-four hours or more.

A third method for accomplishing the transformation illustrated above is to treat the dihalocyclopropyl steroid I with a molar excess, preferably about 3 to 10 molar equivalents, of an alkali alkoxide, e.g. potassium tertiary butoxide, in an inert solvent medium such as dimethyl sulfoxide, diethyl ether, dioxane, tetrahydrofuran, and the like, at room temperature or above for a period of time of the order of two to twenty-four hours or more.

The novel compounds of the present invention may also be prepared by treatment of the 17α-dihalocyclopropyl steroids (I) with an alkyl lithium reagent such as butyl lithium in an inert solvent medium such as a hydrocarbon, ether, chlorinated hydrocarbon, and mixtures thereof, e.g. hexane and tetrahydrofuran. The alkyl lithium reagent should be present in a molar excess, for example, about 2 to 10 molar equivalents. The reaction may be conducted at room temperature or above and a time of the order of about 3 to 24 hours or more is usually required.

The 17α-dihalocyclopropyl starting compounds characterized by Formula I above are prepared according to a process which may be illustrated as follows:

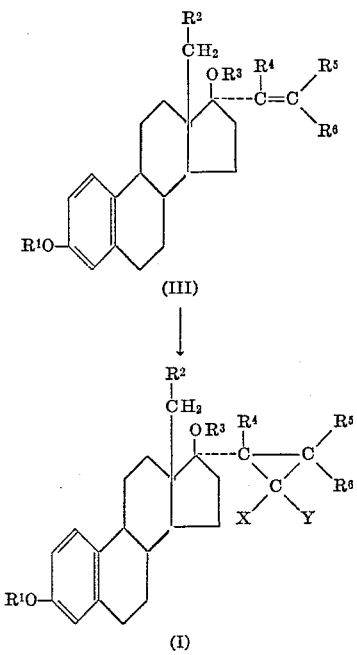

wherein $R^1$, $R^2$, $R^3$, $R^4$, $R^5$, $R^6$ and X and Y are as defined above.

In the practice of the above illustrated process, an estra-1,3,5(10)-triene having a vinyl or methyl substituted vinyl group in the 17α-position (III) is treated with a dihalocarbene, as is generated for example from alkali metal salts of trihaloacetic acid, e.g., sodium trichloroacetate, sodium chlorodifluoroacetate, sodium tribromoacetate, and sodium dichlorofluoroacetate, to yield the corresponding 17α-dihalocyclopropyl derivatives of Formula I. The reaction is conducted under anhydrous conditions in an inert organic solvent such as diethylene glycol dimethyl ether, triethylene glycol dimethyl ether, or the like. Other reagents known to generate dihalocarbenes, such as trimethyl(trifluoromethyl)tin, phenyl(trichloromethyl)mercury, phenyl (bromodichloromethyl)-mercury, and the like, with sodium iodide, may also be used in a similar fashion. The 17α-dibromocyclopropyl compounds may also be prepared through the action of bromoform and potassium t-butoxide on a 17α-alkenyl derivative of Formula III.

The 17α-alkenyl compounds of Formula III may be readily prepared from the corresponding 17-keto compounds through conventional methods, e.g. treatment with alkenyl magnesium halides. Alternatively, the 17α-alkenyl compounds may be obtained from the corresponding 17α-alkynyl compounds through controlled hydrogenation in accordance with conventional procedures.

The 17α-alkenyl-17β-hydroxy compounds may be converted to the corresponding 17β-acyloxy, 17β-tetrahydropyran-2-yloxy, or 17β-tetrahydrofuran-2-yloxy derivatives via conventional methods prior to preparing the 17α-cyclopropyl steroids of Formula I or may be esterified or etherified thereafter.

The substituent in the 3-position of the estratriene nucleus of the novel compounds of the present invention may be a hydroxy group or an etherified, e.g. methoxy, tetrahydropyran-2-yloxy, tetrahydrofuran-2-yloxy, cyclopentyloxy, and the like, or an esterified, e.g. acetoxy, benzoyloxy, and the like, derivative thereof. These derivatives may be formed prior to the preparation of the novel 17α-dienes of Formula II of the present invention or may be formed thereafter via conventional methods. Thus treatment with an appropriate carboxylic acid anhydride, such as acetic anhydride, in pyridine with a 3,17β-dihydroxy compound yields the 3-acyloxy-17β-hydroxy derivative selectively. Use of an acid anhydride in the presence of the corresponding acid and an acid catalyst such as p-toluenesulfonic acid yields the 3,17β-diacyloxy derivative. This diester may then be selectively saponified as through the use of methanolic potassium bicarbonate to yield the corresponding 3-hydroxy-17β-acyloxy derivative. Similarly, etherification may be performed via conventional procedures. Thus, treatment with dihydropyran in the presence of an acid catalyst such as p-toluenesulfonic acid, p-toluenesulfonyl chloride, dinitrobenzene sulfonic acid or the like, yields the corresponding tetrahydropyran-2-yloxy derivative. Formation of the mono-tetrahydropyranyl ether may be accomplished by selective protection of other hydroxy groups as through ester formation, in the manner described above, with alkaline hydrolysis of such ester groups after formation of the ether, if desired. Formation of 3-methoxy derivatives may likewise be realized through the use of dimethylsulfate and potassium hydroxide in the conventional manner.

The following detailed examples are presented to illustrate the preparation of the novel compounds of the present invention, not as a limitation thereof.

Example 1

A solution of 5 g. of 3-hydroxyestra-1,3,5(10)-trien-17-one in 250 ml. of thiophene-free benzene is treated with 10 equivalents of isopropenylmagnesium bromide in anhydrous ether. The mixture is heated at reflux under anhydrous conditions for 24 hours, cooled, and cautiously treated with ethyl acetate and these extracts are in turn washed with water, dried over sodium sulfate and evaporated to dryness to yield 17α-isopropenylestra-1,3,5-(10)-triene-3,17β-diol which may be recrystallized from methylene chloride:hexane.

In a similiar manner, 3-hydroxy-18-methylestra-1,3,5 (10)-trien-17-one, 3-hydroxy-18 - ethylestra - 1,3,5(10)-trien-17-one, and 3-hydroxy-18-n-propylestra-1,3,5(10)-trien-17-one are subjected to the foregoing procedure to yield the corresponding 17α-isopropenyl-17β-hydroxy compounds.

By the use of 3-methyl-2-butenylmagnesium bromide in the foregoing procedure, there is obtained 17α-(3'-methyl-2'-butenyl-estra-1,3,5(10)-triene-3,17β-diol; 17α-(3'-methyl-2'-butenyl)-18-methylestra - 1,3,5(10) - triene - 3,17β-diol, 17α-(3'-methyl-2'-butenyl)-18-ethylestra - 1,3,5(10)-triene-3,17β-diol, and 17α-(3'-methyl-2'-butenyl) - 18 - n-propylestra-1,3,5(10)-triene-3,17β-diol, respectively.

By the use of 1-methyl-1-propenylmagnesium bromide, 1-propenylmagnesium bromide and vinylmagnesium bromide in the foregoing procedure, the corresponding 17α-(1'-methyl-1'-propenyl) and 17α-(1'-propenyl) and 17α-vinyl derivatives are obtained.

The Grignard reagents employed in the foregoing procedure are prepared via conventional procedures from magnesium and an appropriate olefinic halide. Thus, the Grignard reagents may be prepared in the following manner.

To a mixture of 8.0 g. of magnesium shavings and 100 ml. of dry ether cooled in an ice-bath, there is added, with stirring, 24 g. of 2-bromo-3-methyl-2-butene in 40 ml. of dry ether in a dropwise manner. After addition is complete, the mixture is refluxed for one hour to furnish 3-methyl-2-butenylmagnesium bromide.

In a similar fashion, by use of the appropriate olefinic bromide, i.e. vinyl bromide, 2-bromo-2-butene, 2-bromo-1-propene, and 1-bromo-1-propene, in the foregoing procedure, the corresponding Grignard reagent is obtained, i.e. vinylmagnesium bromide, 1-methyl-1-propenylmagnesium bromide, isopropenylmagnesium bromide, and 1-propenylmagnesium bromide, respectively.

A mixture of 1 g. of 17α-isopropenylestra-1,3,5(10)-triene-3,17β-diol, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 3,17β-diacetoxy-17α-isopropenylestra-1,3,5(10)-triene, which is recrystallized from acetone:ether.

In a similar manner, the other 3,17β-diol compounds prepared above may be converted to the corresponding 3,17β-diacetoxy derivatives. Through the use of other acids and anhydrides in the above procedure, the corresponding diacylates are similarly prepared.

One gram of 3,17β-diacetoxy-17α-isopropenylestra-1,3,5 (10)-triene is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17β-acetoxy-17α-isopropenylestra-1,3,5(10)-trien-3-ol which is collected by filtration and recrystallized from acetone:hexane.

To a refluxing solution of 5 g. of 17β-acetoxy-17α-isopropenylestra-1,3,5(10)-trien-3-ol in 500 ml. of ethanol are added over a 30 minute period 20 ml. of dimethyl sulfate and 80 g. of potassium hydroxide in 50 ml. of water, 5 ml. portions of each be alternately added. The mixture is then refluxed for 45 minutes, cooled and poured into ice water. The solid which forms upon neutralization with hydrochloric acid is collected, washed with water and dried to yield 3-methoxy-17β-acetoxy-17α-isopropenylestra-1,3,5(10)-triene which is recrystallized from chloroform:methanol.

In a similar fashion, the above prepared 3,17β-diacetoxy derivatives may be subjected to the foregoing procedure to obtain the corresponding 3-methoxy-17β-acetoxy derivatives.

The requisite 17α-alkenyl starting materials may also be prepared by subjecting a 17α-alkynyl compound to hydrogenation in the following manner.

A solution of 1 g. of 3-methoxy-17α-ethynyl-18-methylestra-1,3,5(10)-trien-17β-ol in 40 ml. of pyridiene is hydrogenated at 25° C. atmospheric pressure in the presence of 0.4 g. of prehydrogenated 2% palladium-on-calcium carbonate. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried and evaporated to dryness to yield 3-methoxy-17α-vinyl-18-methylestra-1,3,5(10)-trien-17β-ol which is further purified through recrystallization from acetone.

In a similar manner, by use of the foregoing procedure other 17α-alkynyl compounds may be converted to the corresponding 17α-alkenyl derivatives, for example, 17α-methylethynyl to 17α-methylvinyl (1'-propenyl).

Example 2

To a refluxing solution of 1 g. of 3-methoxy-17α-vinyl-17β-acetoxyestra-1,3,5(10)-triene in 10 ml. of diethylene glycol dimethyl ether is added over a two hour period in a dropwise fashion with stirring, a solution of 35 molar equivalents of sodium trichloroacetate in 40 ml. of diethylene glycol dimethyl ether. After refluxing for an additional hour, the mixture is filtered. The filtrate is evaporated to dryness and the residue is chromatographed on alumina, eluting with methylene chloride, to yield 3-methoxy-17α-(2',2'-dichlorocyclopropyl) - 17β - acetoxyestra-1,3,5(10)-triene.

In a like fashion, 3-methoxy-17α-vinyl-17β-acetoxy-18-methylestra 1,3,5(10)-triene,
17α-vinyl-17β-acetoxyestra-1,3,5(10)-trien-3-ol,
3-methoxy-17α-isopropenyl-17β-acetoxyestra-1,3,5(10)-triene,
3-methoxy-17α-(1'-methyl-1'-propenyl)-18-ethyl-17β-acetoxyestra-1,3,5(10)-triene,
17α-(1'-propenyl)-estra-1,3,5(10)-triene-3,17β-diol,
17β-acetoxy-17α-(1'-propenyl)-estra-1,3,5(10)-trien-3-ol,
17β-acetoxy-17α-vinyl-18-methylestra-1,3,5(10)-trien-3-ol,
17β-acetoxy-17α-vinyl-18-n-propylestra-1,3,5(10)-trien-3-ol, and
17α-(3'-methyl-2'-butenyl)-estra-1,3,5(10)-triene-3,17β-diol are subjected to the foregoing procedure to yield 3-methoxy-17α(2',2'-dichlorocyclopropyl)-17β-acetoxy-18-methylestra-1,3,5(10)-triene,
17α-(2',2'-dichlorocyclopropyl)-17β-acetoxyestra-1,3,5(10)-trien-3-ol,
3-methoxy-17α(2',2'-dichloro-1'-methylcyclopropyl)-17β-acetoxyestra-1,3,5(10)-triene,
3-methoxy-17α-(2',2'-dichloro-1',3'-dimethylcyclopropyl)-18-ethyl-17β-acetoxyestra-1,3,5(10)-triene,
17β-acetoxy-17α-(2',2'-dichloro-3'-methylcyclopropyl)-estra-1,3,5(10)-trien-3-ol,
17β-acetoxy-17α-(2',2'-dichlorocyclopropyl)-18-methylestra-1,3,5(10)-trien-3-ol,
17β-acetoxy-17α-(2',2'-dichlorocyclopropyl)-18-n-propylestra-1,3,5(10)-trien-3-ol, and
17α(2',2'-dichloro-1',3',3'-trimethylcyclopropyl)-estra-1,3,5(10)-triene-3,17β-diol, respectively.

By the use of sodium tribromoacetate in the above procedure, the corresponding dibromo derivatives are obtained, e.g.

3-methoxy-17α-(2',2'-dibromocyclopropyl)-17β-acetoxyestra-1,3,5(10)-triene,
3-methoxy-17α-(2',2'-dibromocyclopropyl)-17β-acetoxy-18-methylestra-1,3,5(10)-triene,
17α-(2',2'-dibromocyclopropyl)-17β-acetoxyestra-1,3,5(10)-trien-3-ol,
17α-(2',2'-dibromo-3'-methylcyclopropyl)-17β-acetoxyestra-1,3,5(10)-trien-3-ol, etc.

By the use of sodium chlorodifluoroacetate in the foregoing procedure, the corresponding difluoro derivatives are obtained, e.g. 3-methoxy-17α-(2',2'-difluorocyclopropyl)-17β-acetoxyestra-1,3,5(10)-triene.

The corresponding 17β-hydroxy derivatives may be alternatively used in the foregoing procedure, the products thus obtained being similarly unesterified in the 17β-position.

Example 3

A solution of 0.17 g. of potassium hydroxide in 0.2 ml. of water and 2.5 ml. of methanol is added over 30 minutes to a refluxing solution of 1 g. of 3-methoxy-17β-acetoxy-17α-(2',2' - dichlorocyclopropyl)-estra-1,3,5(10)-triene in 30 ml. of methanol under nitrogen. The solution is refluxed for 2 hours, cooled, neutralized with acetic acid and concentrated under reduced pressure. After the addition of water, the solid which forms is collected by filtration and dried to yield 3-methoxy-17α-(2',2'-dichlorocyclopropyl)-estra-1,3,5(10)-trien-17β-ol which is recrystalized from acetone:hexane.

Similarly, using the above procedure, the other 17β-acetoxy-17α-dihalocyclopropyl compounds are converted into the corresponding 17β-hydroxy derivatives.

Example 4

Two milliliters of dihydropyran are added to a solution of 1 g. of 3-methoxy-17α-(2',2'-dichlorocyclopropyl)-estra-1,3,5(10)-trien-17β-ol in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3-methoxy-17α-(2',2'-dichlorocyclopropyl) - 17β-(tetrahydropyran-2'-yloxy)- estra-1,3,5(10)-triene which is recrystallized from pentane.

Use of this process with the other 17β-hydroxy compounds described above will similarly yield the corresponding 17β-tetrahydropyran-2'-yloxy derivatives. Similarly, use of the foregoing procedure with 3,17β-diol compounds, e.g. 17α-(2',2'-dibromo-3'-methylcyclopropyl)-estra-1,3,5(10)-triene-3,17β-diol, 17α-(2',2'-dichlorocyclopropyl)-18-methylestra - 1,3,5(10)-triene-3,17β-diol and doubling the amount of dihydropyran present in the reaction mixture furnishes the corresponding bistetrahydropyran-2-yl ethers, e.g. 17α-(2',2'-dibromo-3'-methylcyclopropyl)-3,17β-bis(tetrahydropyran-2'-yloxy) - estra-1,3,5-(10)-triene and 17α-(2',2'-dichlorocyclopropyl)-3,17β-bis(tetrahydropyran-2'-yloxy)-18-methylestra - 1,3,5(10)-triene.

Example 5

A mixture of 1 g. of 17α-(2',2'-dichlorocyclopropyl)-estra-1,3,5(10)-triene-3,17β-diol, 4 ml. of pyridine and 2 ml. of acetic anhydride is allowed to stand at room temperature for 15 hours. The mixture is then poured into ice water and the solid which forms is collected by filtration, washed with water and dried to yield 3-acetoxy-17α-(2',2' - dichlorocyclopropyl)-estra-1,3,5(10)-trien-17β-ol which may be further purified through recrystallization from acetone:hexane.

In a similar manner, the other 3-hydroxy-17α-(2',2'-dihalocyclopropyl) compounds may be selectively converted to the corresponding 3-acetoxy derivatives, as for example 3-acetoxy-17α-(2',2'-dibromocyclopropyl)-estra-1,3,5(10)-trien-17β-ol. Through the use of other anhydrides in the foregoing procedure, the corresponding 3-acylates are similarly prepared.

Example 6

A mixture of 1 g. of 17α-(2',2'-dichlorocyclopropyl)-estra-1,3,5(10)-triene-3,17β-diol, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 3,17β-diacetoxy-17α-(2',2' - chlorocyclopropyl) - estra-1,3,5(10)-triene, which is recrystallized from acetone:ether.

In a similar manner, other 3,17β-diol-17α-dihalocyclopropyl compounds may be converted to the corresponding 3,17β-diacetoxy derivatives, e.g. 3,17β-diacetoxy-17α-(2',2'-dibromocyclopropyl)-estra-1,3,5(10)-triene.

One gram of 3,17β-diacetoxy-17α-(2',2'-dichlorocyclopropyl)-estra-1,3,5(10)-triene is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17β-acetoxy-17α-(2',2'-dichlorocyclopropyl)-estra-1,3,5(10)-triene-3-ol which is collected by filtration and recrystallized from acetone:hexane.

Two milliliters of dihydropyran are added to a solution of 1 g. of 17β-acetoxy-17α-(2',2'-dichlorocyclopropyl)-estra-1,3,5(10)-trien-3-ol in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3-(tetrahydropyran-2'-yloxy)-17β-acetoxy-17α-(2',2' - dichlorocyclopropyl)-estra-1,3,5(10)-triene which is recrystallized from pentane.

A solution of 0.17 g. of potassium hydroxide in 0.2 ml. of water and 2.5 ml. of methanol is added over 30 minutes to a refluxing solution of 1 g. of 3-(tetrahydropyran-2'-yloxy)-17β-acetoxy-17α-(2',2' - dichlorocyclopropyl)-estra-1,3,5(10)-triene in 30 ml. of methanol under nitrogen. The solution is refluxed for 2 hours, cooled, neutralized with acetic acid and concentrated under reduced pressure. After the addition of water, the solid which forms is collected by filtration and dried to yield 3-(tetrahydropyran-2'-yloxy) - 17α - (2',2'-dichlorocyclopropyl)-estra-1,3,5(10)-triene-17β-ol which is recrystallized from acetone:hexane.

Example 7

Two milliliters of dihydropyran are added to a solution of 1 g. of 3-acetoxy-17α-(2',2'-dichlorocyclopropyl)-estra-1,3,5(10)-trien-17β-ol in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3-acetoxy-17α-(2',2'-dichlorocyclopropyl) - 17β - (tetrahydropyran-2'-yloxy)-estra-1,3,5(10)-triene which is recrystallized from pentane.

One gram of the thus-prepared compound is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17α-(2',2'-dichlorocyclopropyl) - 17β - (tetrahydropyran-2'-yloxy)-estra-1,3,5(10)-trien-3-ol, which is collected by filtration and recrystallized from acetone:hexane.

Example 8

To a refluxing solution of 1 g. of 3-methoxy-17α-(2',2'-dichlorocyclopropyl)-17β-acetoxyestra - 1,3,5(10)-triene, 1.3 g. of magnesium shavings, and 25 ml. of anhydrous ether are added over a one hour period 5.7 g. of ethyl bromide. When the addition is complete, the reaction mixture is refluxed an additional hour and then cautiously hydrolyzed by a dropwise addition of water, followed by 10% hydrochloric acid. The ether layer is separated, dried and evaporated to give 3-methoxy-17α- propadienyl-17β-acetoxyestra-1,3,5(10)-triene.

Example 9

A mixture of 1 g. of 3-hydroxy-17α-(2',2'-dichlorocyclopropyl) - 17β - (tetrahydropyran-2'-yloxy)-estra-1,3,5 (10)-triene, 4 molar equivalents of sodium methylsulfinylcarbanion, and 40 ml. of dimethylsulfoxide under nitrogen is allowed to stand at room temperature for 24 hours. Thereafter, the reaction mixture is poured into water and extracted with methylene chloride. The organic extract is washed with water, dried, and evaporated to yield 3-hydroxy-17α-propadienyl - 17β - (tetrahydropyran-2'-yloxy)-estra-1,3,5(10)-triene.

A mixture of the thus-prepared 3-hydroxy-17α-propadienyl - 17β - (tetrahydropyran-2'-yloxy)-estra-1,3,5 (10)-triene and 25 ml. of 60% formic acid is stirred at room temperature for about one hour. The mixture is poured into water and the solid which forms is collected by filtration, washed well with water, and dried to yield 3,17β-diol-17α-propadienylestra-1,3,5(10)-triene.

Example 10

Five milliliters of dihydropyran are added to a solution of 1 g. of 17α-propadienylestra-1,3,5(10)-triene-3,17β-diol in 20 ml. of benzene. About 1 ml. is removed by distillation to remove moisture and 0.6 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3,17-β-bis(tetrahydropyran-2'-yloxy) - 17α - propadienyl-estra-1,3,5(10)-triene which is recrystallized from pentane.

Example 11

To a solution of 1 g. of 3-methoxy-17α-(2',2'-dichlorocyclopropyl) - 17β - (tetrahydropyran-2'-yloxy)-estra-1,3,5(10)-triene in 40 ml. of anhydrous diethyl ether under nitrogen is added dropwise over a ten minute period with stirring 3 molar equivalents of butyl lithium in anhydrous diethyl ether while maintaining the reaction temperature at −35° C. The reaction mixture is allowed to stand for one hour at a temperature of −35° C. Thereafter, the reaction mixture is permitted to rise to room temperature and is then poured into water. The resulting mixture is extracted with methylene chloride:ethyl acetate and the organic extract washed with water, dried and evaporated to dryness to yield 3-methoxy-17α-propadienyl-17β-(tetrahydropyran-2'-yloxy)-estra-1,3,5(10)-triene.

Example 12

A mixture of 1 g. of 3-hydroxy-17α-(2',2'-dibromocyclopropyl)-17β-(tetrahydropyran - 2' - yloxy)-estra-1,3,5(10)-triene, 4 molar equivalents of potassium-t-butoxide, and 35 ml. of dimethyl sulfoxide under nitrogen is allowed to stand at room temperature for 24 hours. Then, the reaction mixture is poured into water, extracted with methylene chloride and the extracts washed with water, dried and evaporated to dryness affording 3-hydroxy-17α-propadienyl-17β-(tetrahydropyran - 2' - yloxy)-estra-1,3,5(10)-triene.

Example 13

A mixture of 1 g. of 17α-(2',2'-dichlorocyclopropyl)-17β-acetoxyestra-1,3,5(10)-triene-3-ol, 5 molar equivalents of cyclopentyl bromide, and 0.5 g. of potassium carbonate in 30 ml. of acetone is refluxed for 24 hours. The reaction mixture is cooled to room temperature and then poured into water. The resulting mixture is extracted with methylene chloride and the organic extracts washed, dried and concentrated to dryness to yield 3-cyclopentoxy-17α-(2',2'-dichlorocyclopropyl)-17β-acetoxyestra - 1,3,5-(10)-triene which may be further purified through recrystallization from methylene chloride:hexane.

Use of the foregoing procedure with other 3-hydroxy compounds will similarly yield the corresponding 3-cyclopentoxy derivatives.

Likewise, through the use of n-butyl bromide in the foregoing procedure in lieu of cyclopentyl bromide, the corresponding 3-n-butyl ether, i.e., 3-n-butoxy-17α-(2',2'-dichlorocyclopropyl) - 17β-acetoxyestra-1,3,5(10) - triene is obtained.

By subjecting 3-cyclopentoxy-17α-(2',2'-dichlorocyclopropyl)-17β-acetoxyestra-1,3,5(10)-triene to the process of Example 8, there is obtained 3-cyclopentoxy-17α-propadienyl-17β-acetoxyestra-1,3,5(10)-triene.

Example 14

The method of Example 8 is repeated using as the starting materials 3-methoxy-17α-(2',2'-dichlorocyclopropyl)-17β-acetoxy - 18 - methylestra-1,3,5(10) - triene, 3,17β-diacetoxy-17α - (2',2' - dibromocyclopropyl)-estra-1,3,5(10)-triene, 3-(tetrahydropyran-2'-yloxy)-17α-(2',2'-dichlorocyclopropyl)-17β-acetoxyestra - 1,3,5(10)-triene and 3 - (tetrahydropyran-2'-yloxy)-17α-(2',2'-dibromocyclopropyl) - 18 - methyl - 17β - acetoxyestra - 1,3,5-(10)-triene thus producing 3-methoxy17α-propadienyl-17β-acetoxy-18-methylestra - 1,3,5(10) - triene, 3,17β-diacetoxy-17α-propadienylestra-1,3,5(10)-triene, 3-hydroxy-17α-propadienyl-17β-acetoxyestra-1,3,5(10)-triene and 3-hydroxy-17α-propadienyl-18 - ethyl - 17β - acetoxyestra-1,3,5(10)-triene, respectively.

Example 15

The method of Example 8 is repeated using as the starting materials 3-n-butoxy-17α-(2',2'-dichlorocyclopropyl)-17β-acetoxy-estra-1,3,5(10)-triene, 3 - methoxy-17α-(2',2'-dichloro-1'-methyl-cyclopropyl)-17β - acetoxyestra-1,3,5(10)-triene, 3-methoxy - 17α - (2',2'-dichloro-1',3'-dimethylcyclopropyl) - 17β - (tetrahydropyran - 2'-yloxy)-estra-1,3,5(10)-triene, and 3,17β-diacetoxy-17α-(2',2'-dichloro - 3' - methylcyclopropyl) - 18 - ethylestra-1,3,5(10)-triene, thus obtaining 3-n-butoxy-17α-propadienyl-17β-acetoxyestra-1,3,5(10)-triene, 3-methoxy-17α-(1'-methylpropadienyl) - 17β - acetoxyestra - 1,3,5(10)-triene, 3-methoxy-17α-(1',3'-dimethylpropadienyl)-17β-(tetrahydropyran-2'-yloxy) - estra - 1,3,5(10)-triene, and 3,17β-diacetoxy-17α-(3'-methylpropadienyl) - 18 - ethylestra-1,3,5(10)-triene, respectively.

Example 16

The method of Example 9 is repeated using as the starting material 3,17β-bis(tetrahydropyran-2'-yloxy)-17α-(2',2'-dichlorocyclopropyl) - 18 - methylestra-1,3,5-(10)-triene, 3-(tetrahydropyran-2'-yloxy)-17α-(2',2'-dichlorocyclopropyl)-17β-acetoxyestra - 1,3,5(10) - triene, 3-methoxy-17α-(2',2'-difluorocyclopropyl) - 17β - (tetrahydropyran - 2' - yloxy) - estra-1,3,5(10) - triene and 3 methoxy-17α-(2',2' - dichloro - 1' - methylcyclopropyl)-17β-(tetrahydropyran-2'-yloxy) - 18 - methylestra - 1,3,5-(10)-triene, thus producing 17α-propadienyl-18-methylestra - 1,3,5(10)-triene-3,17β-diol, 17α-propadienyl-17β-acetoxyestra-1,3,5(10)-trien-3-ol, 3-methoxy-17α-propadienylestra-1,3,5(10)-trien-17β-ol, and 3-methoxy-17α-(1'-methylpropadienyl)-18-methylestra-1,3,5(10) - trien-17β-ol, respectively.

Example 17

A mixture of 2 g. of 17α-propadienyl-17β-(tetrahydropyran-2'-yloxy)-estra-1,3,5(10)-trien-3-ol in 8 ml. of pyridine and 4 ml. of benzoyl chloride is heated at steam bath temperatures for one hour. The mixture is then poured into ice water and the solid which forms is collected by filtration, washed with water and dried to yield 3-benzoyloxy-17α - propadienyl - 17β - (tetrahydropyran-2'-yloxy)-estra-1,3,5(10)-triene which is further purified through recrystallization from methylene chloride:hexane.

Use of this process with the other 3-hydroxy compounds of the present invention will similarly yield the corresponding 3-benzoyloxy derivatives.

Example 18

A mixture of 1 g. of 17α-propadienyl-18-methylestra-1,3,5(10)-triene-3,17β-diol, 4 ml. of pyridine and 2 ml. of acetic anhydride is allowed to stand at room temperature for 15 hours. The mixture is then poured into ice water and the solid which forms is collected by filtration, washed with water and dried to yield 3-acetoxy-17α-propadienyl-18-methylestra-1,3,5(10) - trien - 17β-ol which may be further purified through recrystallization from acetone:hexane.

In a similar manner, the other 3-hydroxy compounds of the present invention, e.g., 17α-propadienylestra-1,3,5-(10)-triene-3,17β-diol, may be converted into the corresponding 3-acetoxy derivatives, e.g., 3-acetoxy-17α-propadienylestra-1,3,5(10)-trien-17β-ol. Through the use of other anhydrides, e.g., propionic anhydride and the like, in this process, the corresponding 3-acylates, e.g., 3-propionate, are similarly prepared.

Example 19

A mixture of 1 g. of 17α-propadienylestra-1,3,5(10)-triene-3,17β-diol, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 3,17β-diacetoxy-17α-propadienylestra-1,3,5(10)-triene, which is recrystallized from acetone:ether.

One gram of the above-prepared 3,17β-diacetate is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17β-acetoxy-17α-propadienylestra-1,3,5(10)-trien-3-ol which is collected by filtration and recrystallized from acetone: hexane.

In a similar fashion, the other 3,17β-diol compounds of the present invention may be subjected to the foregoing procedure to obtain the corresponding 3,17β-diacetoxy and 17β-acetoxy-3-hydroxy derivatives, respectively.

Example 20

Two grams of 3-acetoxy-17α-propadienylestra-1,3,5-(10) trien-17β-ol in 50 ml. of dry diethylene glycol dimethyl ether is added over a 10 minute period to a slurry of 1.3 molar equivalents of sodium hydride in 50 ml. of dry diethylene glycol dimethyl ether. To this mixture is then added 1.1 molar equivalents of 2-chlorotetrahydrofuran in dropwise fashion over a period of about 10 minutes. The resulting mixture is allowed to stand at room temperature for about 24 hours and then warmed on a steam bath for about 1 hour. The mixture is diluted with water and then extracted with ether. The ether extracts are then washed, dried and evaporated to yield 3-acetoxy-17β-(tetrahydrofuran-2′-yloxy)17α-propadienylestra-1,3,5(10)-triene.

By repeating the above process and using other compounds of the present invention having a free hydroxy group in position 3 or 17, the corresponding tetrahydrofuranyl ether derivative, e.g. 3-(tetrahydrofuran-2′-yloxy)-17β-acetoxy-17α-propadienylestra - 1,3,5(10) - triene, 3-methoxy-17β-(tetrahydrofuran-2′-yloxy) - 17α - propadienylstra-1,3,5(10)-triene, etc. is obtained, Similarly, by repeating the process of this example with the exception of using twice the amount of reagents employed above, the 3,17β-diol compounds of the present invention may be converted into the corresponding 3,17β-bis-tetrahydrofuran-2-yl ethers, e.g. 3,17β-bis(tetrahydrofuran-2′-yloxy)17α-propadienyl - 18 - methylestra - 1,3, 5(10)-triene.

Example 21

Two milliliters of dihydropyran are added to a solution of 1 g. of 3-hydroxy-17α-propadienyl-17β-acetoxy-estra-1,3,5(10)-triene in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3-(tetrahydropyran-2′-yloxy)-17α-propadienyl-17β-acetoxyestra-1,3,5(10)-triene which is recystallized from pentane.

Example 22

A solution of 0.17 g. of potassium hydroxide in 0.2 ml. of water and 2.5 ml. of methanol is added over 30 minutes to a refluxing solution of 1 g. of 3-(tetrahydropyran-2′-yloxy)-17α-propadienyl-17β-acetoxyestra - 1,3,5(10) - triene in 30 ml. of methanol under nitrogen. The solution is refluxed for 2 hours, cooled, neutralized with acetic acid and concentrated under reduced pressure. After the addition of water, the solid which forms is collected by filtration and dried to yield 3-(tetrahydropyran-2′-yloxy)-17α-propadienylestra-1,3,5(10)-trien-17β-ol which is recrystallized from acetone:hexane.

Likewise, through the use of the process of this example, other 17β-acyloxy compounds, e.g. 3-methoxy-17α-propadienyl-17β-acetoxy-18-methylestra - 1,3,5(10) - triene, of the present invention may be converted into the corresponding 17β-hydroxy derivatives.

Example 23

A mixture of 1 g. of 3-n-butoxy-17α-propadienyl-17β- (tetrahydropyran-2′-yloxy)-estra-1,3,5(10)-triene, 40 ml. of methanol and 15 ml. of 5% oxalic acid is refluxed for about one hour. The reaction mixture is cooled and then poured into water. The resulting mixture is extracted with methylene chloride and the organic extracts washed with water, dried, and concentrated to dryness to yield 3-n-butoxy-17α-propadienylestra-1,3,5(10)-trien-17β-ol.

By use of the forgoing procedure, the other tetrahydropyranyl and tetrahydrofuranyl ethers of the present invetion may be converted to the corresponding free hydroxyl derivatives.

Example 24

A mixture of 1 g. of 3-benzoyloxy-17α-propadienyl-17β-(tetrahydropyran-2′-yloxy)-estra-1,3,5(10)-triene, 40 ml. of dioxane, and 10 ml. of 1% sulfuric acid is allowed to stand at room temperature for 10 minutes. The mixture is then neutralized, concentrated under vacuum to a small volume and poured into water. The solid which forms is collected by filtration, washed well with water, and dried to yield 3-benzoyloxy-17α-propadienylestra-1,3,5(10)-trien-17β-ol.

What is claimed is:
1. A compound of the formula

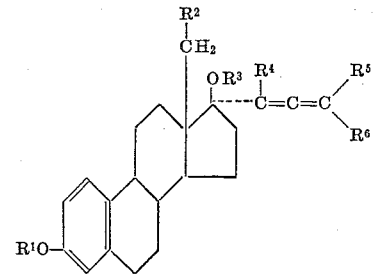

wherein:
$R^1$ is selected from the group consisting of hydrogen, lower alkyl, cycloalkyl, a carboxylic acyl group of less than 12 carbon atoms, tetrahydropyran-2-yl, and tetrahydrofuran-2-yl;
$R^2$ is selected from the group consisting of hydrogen and lower alkyl containing from 1 to 3 carbon atoms;
$R^3$ is selected from the group consisting of hydrogen, a carboxylic acyl group of less than 12 carbon atoms, tetrahydropyran-2-yl, and tetrahydrofuran-2-yl; and each of $R^4$, $R^5$ and $R^6$ is selected from the group consisting of hydrogen and methyl.

2. A compound according to claim 1 wherein $R^4$, $R^5$ and $R^6$ are each hydrogen.

3. A compound according to claim 1 wherein $R^1$, $R^4$, $R^5$ and $R^6$ are each hydrogen and $R^3$ is tetrahydropyran-2-yl.

4. A compound according to claim 1 wherein $R^1$ is methyl and $R^4$, $R^5$ and $R^6$ are each hydrogen.

5. A compound according to claim 1 wherein $R^1$ is methyl and $R^3$, $R^4$, $R^5$ and $R^6$ are each hydrogen.

6. A compound according to claim 1 wherein $R^1$ is methyl and $R^2$, $R^3$, $R^4$, $R^5$ and $R^6$ are each hydrogen.

7. A compound according to claim 1 wherein $R^1$ is cyclopentyl and $R^4$, $R^5$ and $R^6$ are each hydrogen.

8. A compound according to claim 1 wherein $R^1$ is tetrahydropyran-2-yl and $R^4$, $R^5$ and $R^6$ are each hydrogen.

9. A compound according to claim 1 wherein $R^1$ is tetrahydropyran-2-yl and $R^3$, $R^4$, $R^5$ and $R^6$ are each hydrogen.

10. A compound according to claim 1 wherein $R^1$ is tetrahydropyran-2-yl, $R^3$ is acetyl and $R^4$, $R^5$ and $R^6$ are each hydrogen.

11. A compound according to claim 1 wherein $R^1$ is butyl and $R^4$, $R^5$ and $R^6$ are each hydrogen.

12. A compound according to claim 1 wherein $R^1$ is benzoyl and $R^4$, $R^5$ and $R^6$ are each hydrogen.

13. A compound according to claim 1 wherein $R^2$, $R^4$, $R^5$ and $R^6$ are each hydrogen.

14. A compound according to claim 1 wherein $R^2$ is methyl and $R^4$, $R^5$ and $R^6$ are each hydrogen.

15. A compound according to claim 1 wherein $R^4$ is methyl and $R^5$ and $R^6$ are each hydrogen.

16. A compound according to claim 1 wherein $R^5$ is methyl and $R^4$ and $R^6$ are each hydrogen.

17. A compound according to claim 1 wherein $R^5$ is methyl.

18. A compound according to claim 1 wherein $R^1$, $R^2$, $R^3$, $R^4$, $R^5$ and $R^6$ are each hydrogen.

References Cited
UNITED STATES PATENTS 3,107,257  10/1963  Counsell _____ 260—397.5

LEWIS GOTTS, *Primary Examiner.*

T. M. MESHBESHER, *Assistant Examiner.*

Notice of Adverse Decision in Interference

In Interference No. 97,277 involving Patent No. 3,392,165, J. A. Edwards and L. H. Knox, deceased, by A. A. Knox, ESTRA-1,3,5(10)TRIENES SUBSTITUTED AT THE 17α-POSITION WITH A PROPADIENYL OR SUBSTITUTED PROPADIENYL RADICAL, final judgment adverse to the patentees was rendered May 10, 1974, as to claim 15.

[*Official Gazette of September 24, 1974.*]

Disclaimer 3,392,165.—*John A. Edwards*, Los Altos, Calif., and *Lawrence H. Knox*, deceased, late of Mexico City, Mexico, by *Anne A. Knox*, Mexico City, Mexico. ESTRA-1,3,5(10)-TRIENES SUBSTITUTED AT THE 17α-POSITION WITH A PROPADIENYL OR SUBSTITUTED PROPADIENYL RADICAL. Patent dated July 9, 1968. Disclaimer filed Apr. 9, 1976, by the assignee, *Syntex Corporation*.

Hereby enters this disclaimer to claims 6 and 18 of said patent.

[*Official Gazette June 1, 1976.*]